(12) United States Patent
Kambara et al.

(10) Patent No.: US 7,771,694 B2
(45) Date of Patent: Aug. 10, 2010

(54) CRIMPED CARBON FIBER AND PRODUCTION METHOD THEREOF

(75) Inventors: Eiji Kambara, Kawasaki (JP); Katsuyuki Tsuji, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 1132 days.

(21) Appl. No.: 10/565,003

(22) PCT Filed: Aug. 26, 2004

(86) PCT No.: PCT/JP2004/012676

§ 371 (c)(1),
(2), (4) Date: Jan. 19, 2006

(87) PCT Pub. No.: WO2005/019511

PCT Pub. Date: Mar. 3, 2005

(65) Prior Publication Data

US 2006/0188717 A1    Aug. 24, 2006

Related U.S. Application Data

(60) Provisional application No. 60/499,367, filed on Sep. 3, 2003.

(30) Foreign Application Priority Data

Aug. 26, 2003   (JP)   .............................. 2003-301546
Jan. 22, 2004    (JP)   .............................. 2004-014512

(51) Int. Cl.
*D01F 9/12*    (2006.01)
*D02G 3/00*    (2006.01)

(52) U.S. Cl. ................. 423/447.1; 423/447.2; 428/364; 428/367; 977/762; 977/764

(58) Field of Classification Search ...................... None
See application file for complete search history.

(56) References Cited

U.S. PATENT DOCUMENTS 4,816,289 A * 3/1989 Komatsu et al. ......... 423/447.3

(Continued)

FOREIGN PATENT DOCUMENTS

JP            60-27700 A       2/1985

(Continued)

OTHER PUBLICATIONS

R.T.K. Baker, et al., "Formation of Filamentous Carbon from Iron, Cobalt and Chromium Catalyzed Decomposition of Acetylene", Journal of Catalysis, 30, 86-95 (1973).

(Continued)

*Primary Examiner*—Jill Gray
(74) *Attorney, Agent, or Firm*—Sughrue Mion, PLLC

(57) ABSTRACT

A crimped carbon fiber having a multilayer structure comprising a hollow structure in the inside, with the inner layer part having a carbon structure containing a herringbone structure and the outer layer part having a carbon structure differing from the carbon structure of the inner layer part. A method for producing a crimped carbon fiber, comprising contacting a carbon source and/or a catalyst source with a sulfur source in a heating zone to produce a vapor grown carbon fiber, wherein the ratio of the molar number of sulfur atom in the sulfur source to the molar number of the catalyst metal atom is 2.0 or more.

10 Claims, 9 Drawing Sheets

U.S. PATENT DOCUMENTS

| | | | |
|---|---|---|---|
| 6,969,503 B2* | 11/2005 | Yanagisawa et al. | 423/447.2 |
| 2003/0044602 A1* | 3/2003 | Yanagisawa et al. | 428/367 |
| 2003/0044603 A1* | 3/2003 | Morita et al. | 428/367 |
| 2003/0044685 A1* | 3/2003 | Yanagisawa et al. | 429/231.8 |
| 2004/0166048 A1 | 8/2004 | Morita et al. | |
| 2009/0004095 A1* | 1/2009 | Yoon et al. | 423/447.2 |
| 2009/0191116 A1* | 7/2009 | Yoon et al. | 423/447.6 |

FOREIGN PATENT DOCUMENTS

| | | |
|---|---|---|
| JP | 60-54998 A | 3/1985 |
| JP | 61-225319 A | 10/1986 |
| JP | 2778434 B2 | 5/1998 |
| JP | 2002-159851 A | 6/2002 |
| JP | 2003-73930 A | 3/2003 |
| JP | 2003-166130 A | 6/2003 |
| JP | 2003-073930 A | 12/2003 |
| WO | WO 03/006726 A1 | 1/2003 |
| WO | WO 03/027368 A1 | 4/2003 |

OTHER PUBLICATIONS

Nelly M. Rodriguez, et al., "Catalytic Engineering of Carbon Nanostructures", Langmuir 1995, 11, 3862-3866.

* cited by examiner

5nm

CRIMPED CARBON FIBER AND PRODUCTION METHOD THEREOF

CROSS REFERENCE TO RELATED APPLICATION

This application is an application filed under 35 U.S.C. §111(a) claiming benefit pursuant to 35 U.S.C. §119(e) (1) of the filing date of the Provisional Application No. 60/499,367 filed on Sep. 3, 2003, pursuant to 35 U.S.C. §111(b).

TECHNICAL FIELD

The present invention relates to a crimped carbon fiber which is suitably used, for example, as a filler material for improving electric or thermal conductivity by adding it to various materials such as metal, resin and ceramic, as an electron-emitting material for FED (field emission display), as a medium for occluding hydrogen, methane or various gases, as a filler material for materials for improving properties of various batteries, or as a catalyst support, and also relates to a production method thereof.

BACKGROUND ART

Studies of vapor grown carbon fiber started in the latter 1980s and it has been found that when a gas such as hydrocarbon is thermally decomposed in vapor phase in the presence of a metal catalyst, a carbon fiber having a diameter of 1,000 nm or less and a length of about several tens of μm is obtained.

For example, there is disclosed a method where an organic compound such as benzene is used as the raw material and an organic transition metal compound such as ferrocene is introduced as the catalyst precursor together with a carrier gas into a high-temperature reaction furnace to produce a carbon fiber on a substrate (Japanese Unexamined Patent Publication (Kokai) No. 60-27700), to produce a vapor grown carbon fiber in the suspended state (Japanese Unexamined Patent Publication (Kokai) No. 60-54998) or to grow a carbon fiber on a reaction furnace wall (Japanese Patent No. 2778434).

According to this production method, a relatively thin carbon fiber excellent in electric or thermal conductivity and having a large aspect ratio is obtained and carbon fibers having a fiber outer diameter of about 10 to 200 nm and an aspect ratio of about 10 to 500 are already being mass-produced.

Also, as a carbon fiber thinner than such a vapor grown carbon fiber, Iijima et al., have discovered a carbon nanotube from a soot obtained by evaporating a carbon electrode by arc discharge in a helium gas. This carbon nanotube is a linear fiber having a diameter of 1 to 30 nm and a large aspect ratio and this is a fine carbon fiber where similarly to the vapor grown carbon fiber, hexagonal carbon layers are multiply stacked around the fiber axis like a tree-growth-ring and closed at the tip and the inside thereof is hollow.

Other than this linear carbon fiber, a crimped carbon fiber is also known. For example, in Japanese Unexamined Patent Publication (Kokai) No. 61-225319, a carbon fiber having a solid and tree-growth-ring structure and having a percentage crimp of 0.5 to 50%, a fiber outer diameter of 0.05 to 4 μm and an aspect ratio of 100 or more is provided. It is disclosed that this crimped carbon fiber easily forms a network among fibers in a matrix as compared with the linear carbon fiber and by virtue of crimp, fibers are entangled with each other when filled as a filler in metal, resin, ceramic or the like, so that the contacting ratio increases and in turn the electric conductivity is enhanced. However, this carbon fiber has an aspect ratio as large as 100 or more, and therefore has a problem in dispersibility in metal, resin, ceramic or the like. *Journal of Catalysis*, 30, 86-95 (1973) similarly discloses a crimped fiber, but the synthesis thereof is performed under very specific and non-industrial conditions, that is, in an electron microscope and also, the structure and properties of the carbon fiber obtained are not disclosed.

A carbon fiber having a large aspect ratio has a problem in dispersibility at kneading as a filler material with a matrix component such as metal, resin or ceramic, and is disadvantageous in that uniform dispersion in a matrix is difficult to obtain, an excessive amount of filler is necessary for obtaining desired properties, a special dispersing machine is required for the dispersion and the profitability is low.

In order to enhance the dispersibility of a carbon fiber having a large aspect ratio, a technique of mechanically cutting the carbon fiber by grinding or the like or shortening the fiber length by a chemical treatment is known. However, such a technique is deficient not only in that an extra step is necessary and the profitability is low, but also in that linear short fibers can hardly form a network among fibers and the properties such as electric conductivity are not satisfactorily brought out.

In addition, these carbon fibers are a fiber having a structure in which hexagonal carbon layers are stacked and wound like a tree-growth-ring and a very thin hollow is present in the inside. In the carbon fiber having such a tree-growth-ring structure, the fiber surface is inactive, and therefore the carbon fiber is neither used as a filler nor as an adsorbent for occluding hydrogen, methane or various gases or a catalyst support.

With an attempt to alter the structure of these carbon fibers, a herringbone-type carbon fiber or a hollow-free carbon fiber (plate-type fiber) where carbons are vertically stacked on the fiber axis is disclosed (*Langmuir.*, 11, 3862-3866 (1995)). These carbon fibers have a very active surface. Also, Japanese Unexamined Patent Publication (Kokai) No. 2003-73930 discloses a multilayer carbon fiber having a multilayer structure containing a hollow structure in the inside, where the carbon structure of the inner part contains a herringbone structure or a shape that carbons are vertically stacked on the fiber axis, and the carbon structure of the outer layer part contains a tree-growth-ring structure. These fibers are, similarly to conventional vapor grown carbon fibers and the like, a linear fiber having a large aspect ratio and because of their poor dispersibility on use as a filler material, these are not used in practice.

As the carbon compound analogous to the vapor grown carbon fiber, a single-walled carbon nanohorn is known and application thereof to an adsorbent for occluding hydrogen, methane or various gases or a catalyst support is disclosed (Japanese Unexamined Patent Publication (Kokai) No. 2002-159851). In such a single-walled carbon nanohorn, the diameter of the tubular part is from 2 to 3 nm, the fiber length is 30 nm and the specific surface area is about $300 \, m^2/g$. Supposing a cylindrical body, the specific surface area calculated from the fiber outer diameter is about $1,000 \, m^2/g$ and this is a very fine carbon compound, but a carbon nanotube having a fiber outer diameter of several nm is estimated to have a specific surface area equal thereto and when the fiber outer diameter is taken into consideration, this carbon compound cannot be said to have a peculiar specific surface area. Accordingly, when intended to obtain a necessary specific surface area on use, for example, as a material for occluding hydrogen, methane or the like or as a catalyst support, a thin fiber is used. The cost of the thin fiber is generally high because of its low productivity, and use of such a material is unprofitable.

Similarly, a technique of activating the produced carbon fiber by subjecting it to a post treatment such as surface treatment and thereby obtaining a carbon fiber having a high specific surface area is known, but a step for surface treatment or the like is necessary and this is not profitable.

As described above, in using a carbon compound such as vapor grown carbon fiber and carbon nanotube as a filler material, there has been heretofore not present an inexpensive carbon fiber having enhanced dispersibility to express excellent properties such as high electric conductivity and high thermal conductivity and at the same time, having a very large specific surface area to be suitably used as a gas adsorption medium or a catalyst support.

Under these circumstances, an object of the present invention is to provide an inexpensive crimped carbon fiber useful as a filler material for enhancing the electric conductivity, thermal conductivity and strength, as an adsorbent for occluding hydrogen, methane or various gases or as a catalyst support.

DISCLOSURE OF THE INVENTION

The present inventors have accomplished to provide a filler that improves all of electric conductivity, thermal conductivity and strength of a material to which the filler is added, which is a new crimped carbon fiber having a reformed structure of vapor grown carbon fiber, an unconventional shape or carbon structure and a very large specific surface area as compared with the value calculated from the fiber outer diameter which is assumed to be of a cylindrical body.

[1] A crimped carbon fiber having a multilayer structure comprising an inner layer part and an outer layer part with a hollow structure in the inside thereof, the inner layer part having a carbon structure containing a herringbone structure, the outer layer part having a carbon structure differing from the carbon structure of the inner layer part.

[2] A crimped carbon fiber having a multilayer structure comprising a center part and an outer layer part outside the center part with no hollow structure in the inside thereof, the center part having a carbon structure containing a shape that carbon layers vertical to the carbon fiber axis are stacked, the outer layer part having a carbon structure differing from the carbon structure of the inside.

[3] The crimped carbon fiber as described in [2] above, wherein the carbon layers vertical to the carbon fiber axis are in a state that each group comprising one or multiple carbon layer(s) is continued or joined at the end face with another group, and the cross section thereof has a multiply folded and/or ringed form.

[4] The crimped carbon fiber as described in any one of [1] to [3] above, wherein the carbon structure of the outer layer part contains a tree-growth-ring structure.

[5] The crimped carbon fiber as described in any one of [1] to [4] above, wherein the percentage crimp defined by the following formula is about 0.5% or more:

Percentage crimp(%)=(fiber length−distance between fiber terminals)/(fiber length)×100    (1)

[6] The crimped carbon fiber as described in any one of [1] to [5] above, which has a fiber outer diameter of from about 2 to about 500 nm and a fiber length of about 50 μm or less.

[7] The crimped carbon fiber as described in any one of [1] to [6] above, which has an actually measured specific surface area about 1.5 times or more the specific surface area in terms of fiber diameter defined by the following formula (2):

Specific surface area in terms of fiber diameter(m$^2$/g)= 2,000/fiber outer diameter(nm)    (2)

[8] The crimped carbon fiber as claimed in any one of [1] to [7], which has a lattice spacing (d002) of 002-plane measured by X-ray diffraction of less than about 0.34 nm, and a ratio (Id/Ig) between a peak height (Id) in a band of 1340-1349 cm$^{-1}$ and a peak height (Ig) in a band of 1570-1578 cm$^{-1}$ of Raman spectrum of more than about 0.35.

[9] The crimped carbon fiber as described in any one of [1] to [8] above, which is a vapor grown carbon fiber.

[10] A carbon fiber mixture comprising about 5 vol % or more of the crimped carbon fiber described in any one of [1] to [9] above.

[11] A method for producing the crimped carbon fiber described in [9] above, comprising contacting a carbon source and a catalyst source with a sulfur source in a heating zone to produce a vapor grown carbon fiber, wherein the ratio of the molar number of sulfur atom in the sulfur source to the molar number of the catalyst metal atom is 2.0 or more.

[12] The method for producing the crimped carbon fiber as described in [11] above, wherein the sulfur atom in the sulfur source has a vapor-phase concentration of about 0.0001 mol/NL or more in the heating zone.

[13] The method for producing the crimped carbon fiber as described in [11] or [12] above, wherein the sulfur source contains at least one member selected from the group consisting of sulfur, thiophene and hydrogen sulfide.

[14] The method for producing the crimped carbon fiber as described in any one of [11] to [13] above, wherein the carbon source contains at least one member selected from the group consisting of CO, $CO_2$, methane, ethane, propane, butane, heptane, hexane, cyclohexane, ethylene, propylene, butadiene, acetylene, benzene, toluene and xylene.

[15] The method for producing the crimped carbon fiber as described in any one of [11] to [14] above, wherein at least one compound selected from the following groups (A) and (B) is supplied as an addition component to the heating zone:

(A) organic compounds in which the lower of the boiling point and the decomposition temperature thereof is about 180° C. or more, (B) organic compound polymers having a molecular weight of about 200 or more.

[16] The method for producing the crimped carbon fiber as described in any one of [11] to [15] above, wherein the temperature in the heating zone is from more than about 1,200° C. to about 1,350° C.

[17] A method for producing the crimped carbon fiber, comprising subjecting the crimped carbon fiber obtained by the production method as described in any one of [11] to [16] above further to heating at about 800° C. to about 1,500° C. in a non-oxidative atmosphere.

[18] A method for producing the crimped carbon fiber, comprising subjecting the crimped carbon fiber obtained by the production method as described in any one of [11] to [17] above further to heating at about 2,000° C. to about 3,000° C. in a non-oxidative atmosphere.

Figure 1A:
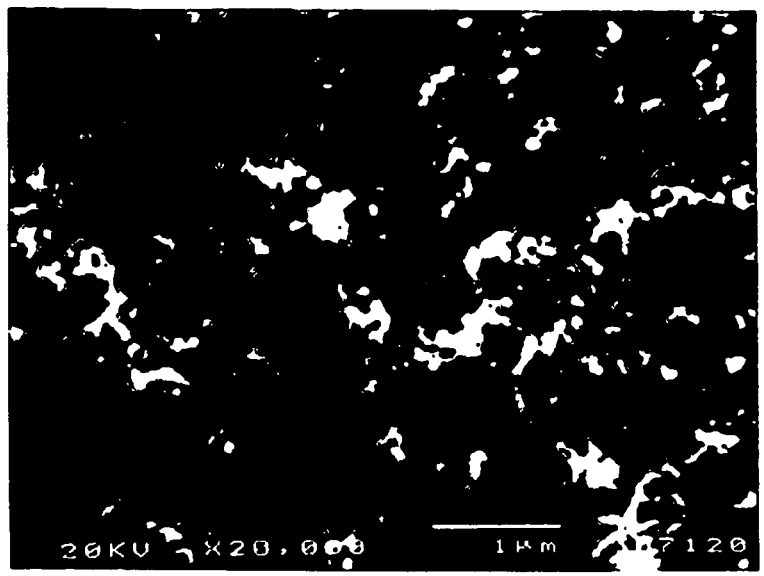
FIGS. 1A and 1B are each a scanning electron microphotograph of the crimped carbon fiber produced in Example 1.

MODES FOR CARRYING OUT THE INVENTION (Shape of Crimped Carbon Fiber)

A first characteristic feature of the crimped carbon fiber of the present invention is that this is a carbon fiber having a crimped shape as shown in FIG. 1. Regarding the crimped carbon fiber, several related arts have been reported as described above, but the crimped carbon fiber of the present invention greatly differs from those known techniques in the carbon structure of the inside and by virtue of this difference, the crimped carbon fiber of the present invention is considered to have an unprecedented high specific surface area.

The crimped carbon fiber of the present invention is characterized in that because of its crimped shape, when blended with metal, resin, ceramic or the like, a network is readily formed among carbon fibers as compared with the linear fiber and this brings about enhancement of the thermal conductivity, electric conductivity and the like. Its optimal shape varies depending on various conditions such as fiber outer diameter, fiber length, blending amount in the matrix, and kneading method. The fiber shape, fiber outer diameter and fiber length are generally observed and measured by using an electron microscope. The shape can be sometimes quantitatively determined by using an electron microscope as in the measurement of percentage crimp which is described later. However, in many cases, an electron microphotograph showing a good dispersion state cannot be obtained due to large effect of fibers overlapping with each other and the degree of crimping cannot be exactly measured. Therefore, it is difficult to quantitatively express the shape.

As one method of quantitatively determining the crimped shape of fiber, the percentage crimp can be sometimes calculated from an electron microphotograph as shown in Japanese Unexamined Patent Publication (kokai) No. 61-225319. In this patent publication, the objective is a long fiber of about 40 μm or more, but the crimped carbon fiber of the present invention contains a fiber having a fiber length of about 50 μm or less and the above-described method cannot be applied as it is. In such a case, the percentage crimp can be calculated according to the following formula (1):

$$\text{Percentage crimp}(\%) = [(\text{fiber length} - \text{distance between fiber terminals})/(\text{fiber length})] \times 100 \quad (1)$$

In this formula, the fiber length and the distance between fiber terminals both are a measured value on an electron microphotograph, that is, a fiber length and a distance between fiber terminals projected on a two-dimensional plane, and these are shorter than respective actual values.

The carbon fiber of the present invention preferably has a percentage crimp of about 0.5% or more, more preferably about 5% or more, and most preferably about 10% or more. If the percentage crimp is small, a carbon fiber network is not easily formed in a composite material and this is not preferred.

(Carbon Structure)

A second characteristic feature of the crimped carbon fiber of the present invention is a stacked structure in the carbon fiber. One representative example of the carbon fiber of the present invention is shown in the transmission electron microphotograph of FIG. 2 and in the schematic views of FIGS. 3a and 3B. In the schematic cross-sectional view of FIG. 3A, a carbon sheet (a layer of graphite or crystal close to graphite; sometimes also called a carbon layer, a hexagonal carbon layer or a graphen) is shown by a solid line. The crimped carbon fiber of the present invention is characterized by having such a multilayer structure consisting of two or more layers and comprising a hollow structure in the inside, where the carbon structure of the inner part contains a herringbone structure and the carbon structure of the outer layer part is a carbon structure except for a herringbone structure (for example, a tree-growth-ring structure where carbon sheets cylindrically overlap each other). The herringbone structure is a stacked structure where the carbon layers are stacked not in parallel to the fiber axis but inclined to a certain degree and the inclination angle is not equal to or near 90° with respect to the fiber axis.

The diameter d0 (see, FIG. 3B) of the hollow structure of the present invention is larger than the hollow diameter of conventional tree-growth-ring fibers and this is from about 10 to about 80% of the outer diameter d of the crimped carbon fiber. The space of the hollow portion may be closed in parts by the carbon layer or may be penetrating and the hollow portion may be continuous or discontinuously present.

The structure of the inner layer part is sufficient if at least a part thereof forms a herringbone-type carbon structure. For example, when observed by a transmission electron microscope, the area of the herringbone-type carbon structure occupying in the entire area of the inner layer part shown in FIG. 3A may be about 20% or more, preferably about 40% or more, more preferably about 50% or more.

As for the size of this inner layer part, the diameter d1 of the inner layer part is preferably in the range of about $1.1\,d0 \leq d1$ and $d1 \leq$ about $0.9\,d$. If the inner layer part is smaller than this range, the gas-occluding capacity may be insufficient, whereas if it is larger than this range, the strength of the crimped carbon fiber may decrease.

The structure of the outer layer part may be any structure as long as it is different from the carbon structure of the inner layer part. In view of the strength of the crimped carbon fiber, the structure of the outer layer part is preferably a tree-growth-ring stacked structure, for example, a structure in which carbon layers (carbon sheets) wind like a tree-growth-ring. Also, the carbon layers winding like a tree-growth-ring may not form a complete graphen (hexagonal carbon layer) cylinder but may be cut in parts or two carbon layers may combine into one layer. The cross section in the vertical direction to the fiber axis of the crimped carbon fiber may not be a complete circle but may have an elliptical or polygonal form. Furthermore, a pyrolytic carbon may be present on the surface of this outer layer part.

Figure 4:
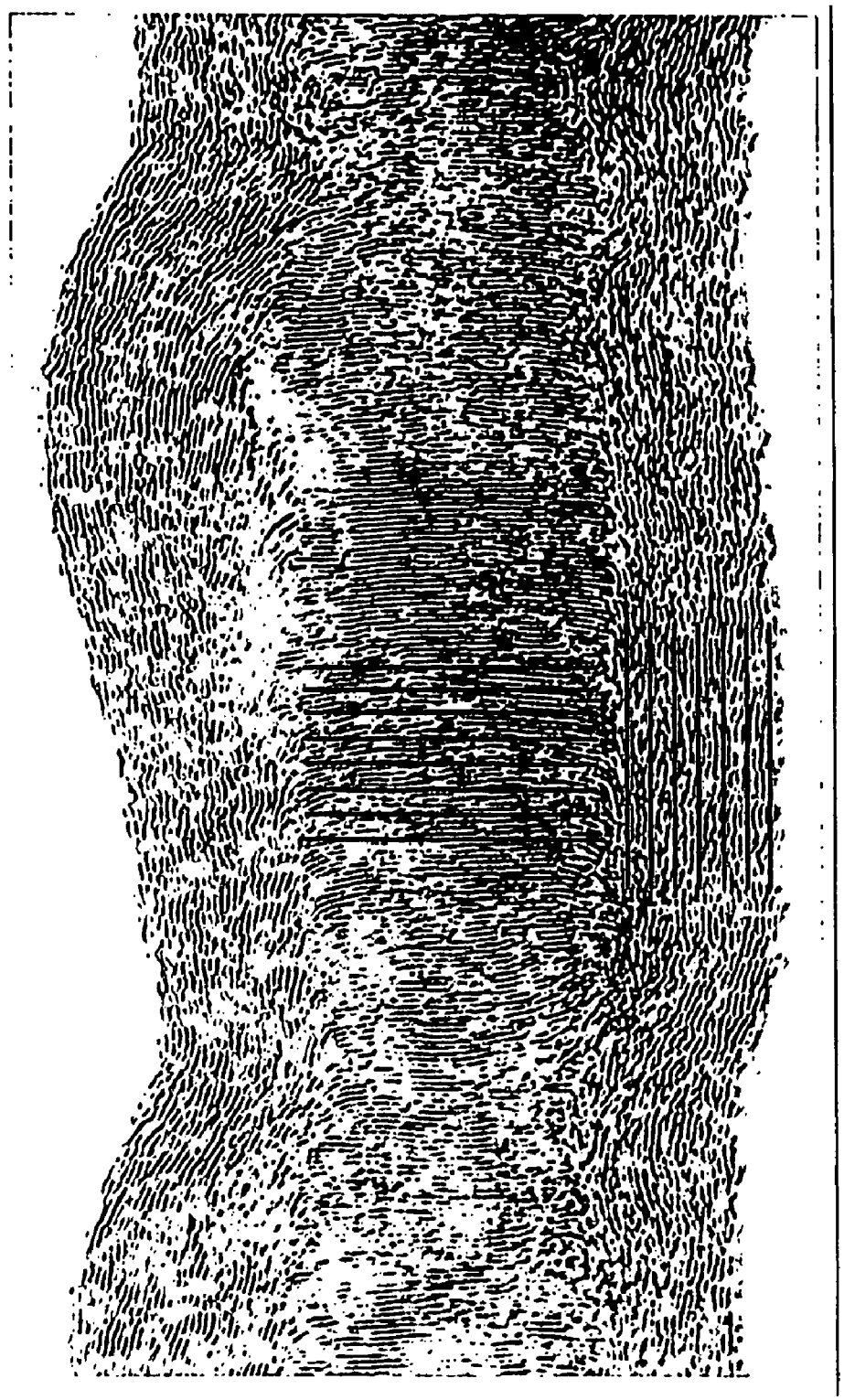
FIG. 4 is a transmission electron microphotograph of the crimped carbon fiber produced in Example 1 (a plate-type center part).
Figure 5:
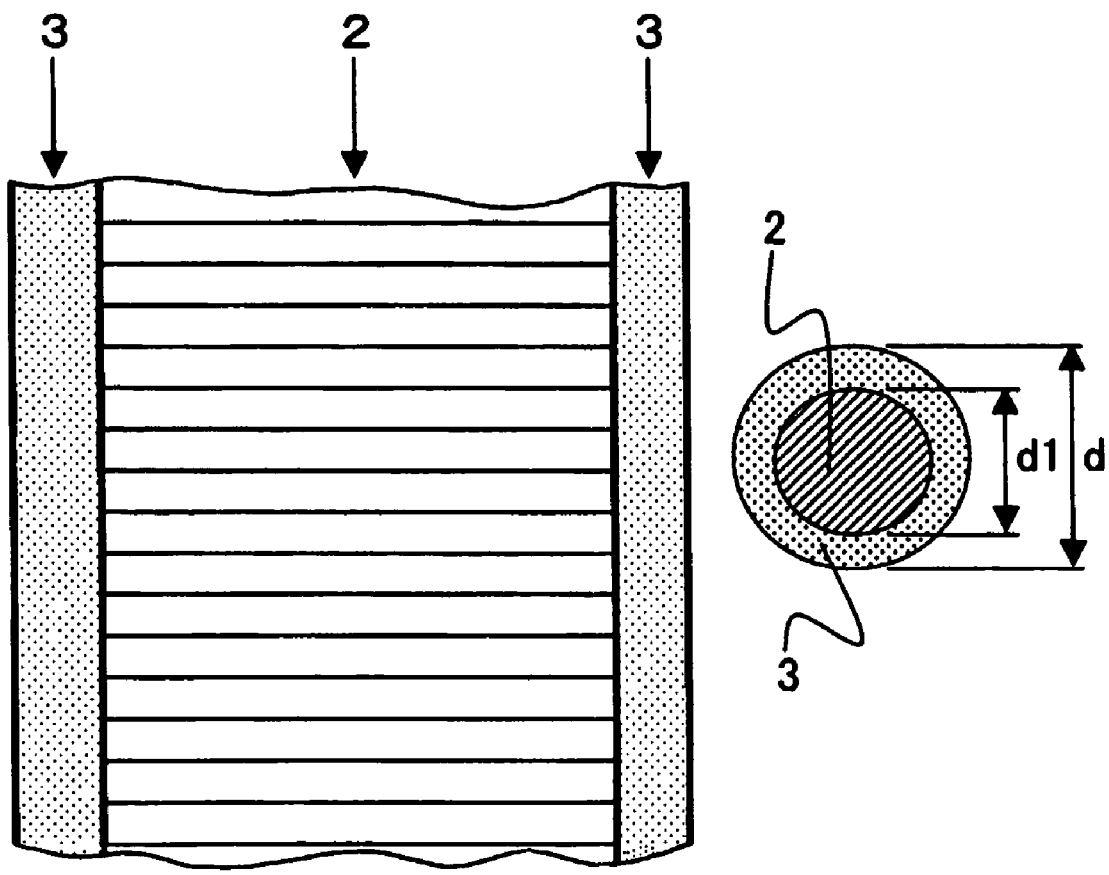
FIGS. 5A and 5B are schematic views of the crimped carbon fiber produced in Example 1 (a cross section of a fiber having a plate-type center part).

The crimped carbon fiber of the present invention is also characterized by having a multilayer structure comprising no hollow structure in the inside as shown in the transmission electron microphotograph of FIG. 4 and in the schematic views of FIGS. 5A and 5B, where the carbon structure of the center part includes a shape in which carbon layers nearly vertical to the carbon fiber axis are stacked (plate structure), and the carbon structure of the outer layer part differs from the carbon structure of the center part.

The structure of the center part is sufficient if at least a part thereof is forming a plate-type carbon structure. For example, when observed by a transmission electron microscope, the area of the plate-type carbon structure occupying in the entire area of the center part may be about 20% or more, preferably about 40% or more, more preferably about 50% or more (see, FIG. 5A).

Figure 8:
FIG. 8 is a transmission electron microphotograph of the crimped carbon fiber produced in Example 7 (the center part has a plate-like folded structure).
Figure 9:
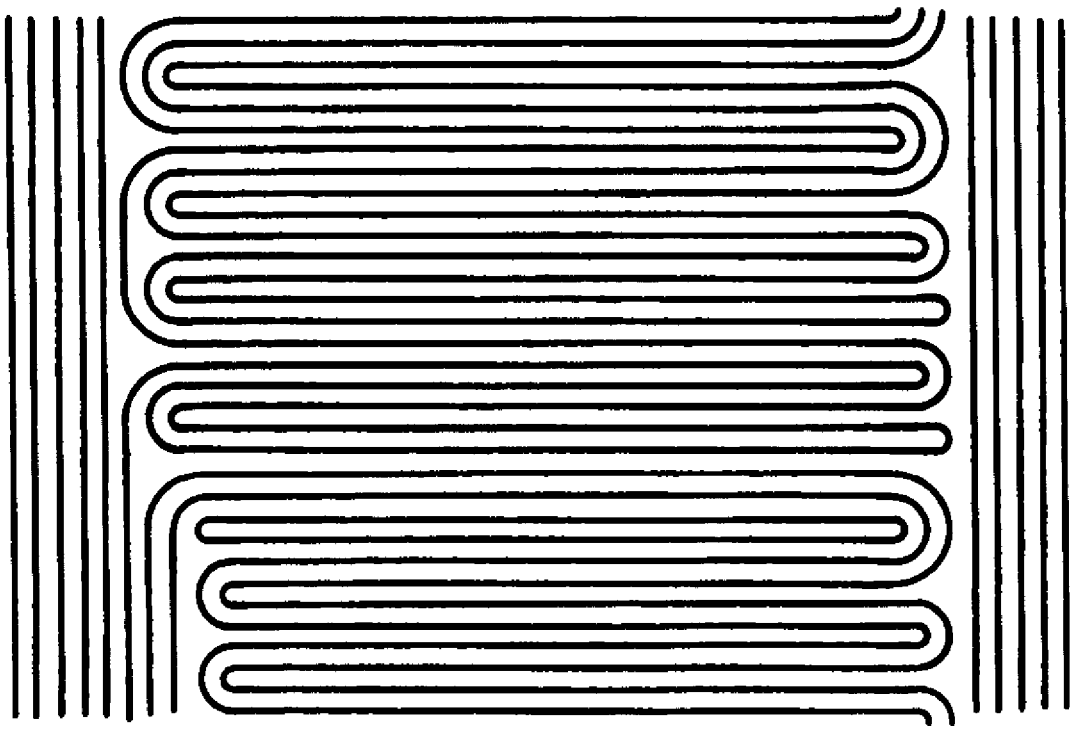
FIG. 9 is a schematic view of the crimped carbon fiber produced in Example 7 (a cross-sectional view of a fiber where the center part has a plate-type folded structure).

The crimped carbon fiber of the present invention is also characterized by having a structure in which as shown in the transmission electron microphotograph of FIG. 8 and in the schematic view of FIG. 9, the carbon layer nearly vertical to the carbon fiber axis is continued (joined) at the end with another upper or lower carbon layer and closed in a multiply folded and/or ringed state. This folded and/or ringed conjunction structure may be formed by alternate layers, or a group comprising multiple carbon layers may be joined with another carbon layer group to form a multiply folded and/or ringed structure. Also, a group comprising multiple carbon layers may be joined at both ends with an upper carbon layer group and a lower carbon layer group differing in the number of carbon layers, and different folded and/or ringed structures may be formed at both ends. In addition, a part of the carbon layer of the center part may be joined and continued at the end with a part of the outer layer part (a carbon layer in the inner side portion of the outer layer part) and accordingly, a part of the carbon layer group may be once continued to a part of the outer layer part and then continued not to a carbon layer of the adjacent group but to a distant carbon layer group.

As for the size of the center part occupying in the crimped carbon fiber, the diameter d1 of the center part is preferably about 90% or less of the outer diameter d of the crimped carbon fiber. If the diameter of the center part exceeds this range, the strength of the crimped carbon fiber may decrease.

The structure of the outer layer part may be any structure as long as it is different from the carbon structure of the center part. In view of strength of the crimped carbon fiber, the structure of the outer layer part is preferably a tree-growth-ring stacked structure, for example, a structure in which carbon layers wind like a tree-growth-ring. Also, the carbon layers winding like a tree-growth-ring may not form a complete graphen (hexagonal carbon layer) cylinder but may be cut in parts or two carbon layers may combine into one layer. The cross section in the vertical direction to the fiber axis of the crimped carbon fiber may not be a complete circle but may have an elliptical or polygonal shape. Furthermore, a pyrolytic carbon may be present on the surface of this outer layer part.

In any form, the crimped carbon fiber of the present invention is characterized by having not a single-layer tree-growth-ring structure as in conventional vapor grown carbon fibers but having a multilayer internal structure. The crimped carbon fiber of the present invention is different from the single-layer herringbone-type fiber and plate-like fiber in that a tree-growth-ring structure is contained in the outer part, and is greatly different from the fiber having a multilayer structure described in Japanese Unexamined Patent Publication (Kokai) No. 2003-73930 in view of the above-described fiber shape (crimped). This difference is considered to give rise to establishment of both the dispersibility in metal, resin or ceramic and the easiness of fiber network formation in metal, resin or ceramic. Such an internal structure is not clarified about its effect on the physical properties but is presumed to contribute to the high specific surface area which is one characteristic feature of the crimped carbon fiber of the present invention.

As the evaluation of the crystallinity of carbon material, there are known a lattice spacing (d002) of a hexagonal carbon layer, (002)-plane, measured by X-ray diffraction, and a ratio (Id/Ig) between a peak height (Id) in a band of 1340-1349 cm$^{-1}$ of Raman spectrum and a peak height (Ig) in a band of 1570-1578 cm$^{-1}$ of Raman spectrum.

In general, a carbon fiber has a d002 of 0.34 nm or more and an Id/Ig of 0.30 or less. The carbon fiber of the present invention preferably has a d002 of less than 0.34 and an Id/Ig of Raman spectrum of more than 0.35, more preferably 0.40 or more, to have the above-described structure.

(Fiber Outer Diameter, Fiber Length and Aspect Ratio)

A third characteristic feature of the crimped carbon fiber of the present invention is in its fiber outer diameter, fiber length and aspect ratio. Heretofore, many studies have been made to obtain a carbon fiber having a low aspect ratio. For example, a method of subjecting a carbon fiber having a large aspect ratio to a treatment such as grinding to obtain a carbon fiber having a predetermined aspect ratio is known. In such a method, a different treatment such as grinding is necessary and therefore, the profitability is low. According to the present invention, a carbon fiber having a low aspect ratio as needed can be directly obtained by a reaction and its economic effect is large.

The fiber outer diameter d is preferably from about 2 to about 500 nm, more preferably from about 2 to about 200 nm, and optimally from about 20 to about 200 nm. As the fiber diameter is smaller, when the weight of fiber added as a filler to metal, resin, ceramic or the like is same, the number of fibers increases and the thermal or electric conductivity is more readily enhanced. If the fiber outer diameter is too small, poor dispersibility results and desired properties may not be obtained.

The fiber length is not particularly limited because its optimal vale varies depending on use. In some cases, a long fiber is preferred rather than a short fiber described below. In this case, the aspect ratio is preferably about 30 or more, and most preferably about 100 or more. In the case of using the fiber as a filler component for resin or the like, a short fiber is preferred because of easy dispersion in the matrix, though this may vary depending on the kneading method. In this case, the fiber length is preferably about 50 μm or less, more preferably from about 0.01 to about 50 μm, and optimally from about 0.01 to about 20 μm. If the fiber length is too large, the dispersibility is worsened, whereas if it is too small, fibers hardly take a network structure with each other and this is not preferred. The aspect ratio (fiber length/fiber outer diameter) of the short fiber is about 100 or less, preferably from about 5 to about 100, and most preferably from about 5 to about 30.

(Specific Surface Area)

A fourth characteristic feature of the crimped carbon fiber of the present invention is the specific surface area calculated by the BET method using nitrogen adsorption (hereinafter, when simply referred to as a specific surface area, this indicates a specific surface area measured by the BET method). As for the carbon material having a large specific surface area, for example, the above-described single-walled carbon nanohorn and single-walled carbon nanotube are known, but the crimped carbon fiber of the present invention is characterized by having a very large specific surface area for its fiber outer diameter (that is, having a very active surface). Accordingly, when the same surface area is required, in the case of the crimped carbon fiber of the present invention, the requirement can be satisfied even by using a carbon fiber having a large fiber diameter as compared with conventional carbon fiber materials. In general, when the fiber outer diameter is rendered small, this is accompanied with not only low productivity in the synthesis of fiber but also poor dispersibility at the filling in metal, resin, ceramic or the like and bad handling property and therefore, is not profitable. The crimped carbon fiber of the present invention can ensure a satisfactory surface area even without producing a thin fiber.

The reduction of fiber outer diameter apparently causes increase in the specific surface area, but it is generally difficult to evaluate the size of specific surface area for the fiber outer diameter. However, in the present invention, this is evaluated as follows. Supposing a cylindrical fiber, when the aspect ratio is approximately from 5 to 100, the specific surface area of the cylinder can be almost indiscriminately determined by the diameter. The specific surface area (SA) by supposing a cylindrical body is $SA=(2\pi D^2/4+D\pi L)/(\pi(D/2)^2 L\rho)$ wherein D is a fiber diameter, L is a fiber length and $\rho$ is a density. Here, by applying aspect ratio $Ar=L/D$, $SA=(2/Ar+4)/D\rho$ is established and since $4>2/Ar$, $SA=$about $4/D\rho$. When it is assumed that $\rho=2$ g/cm$^3$ (empirically, the density is around this value in many cases), $SA=2,000/R$. Then, when the specific surface area in terms of fiber diameter is defined as in formula (2), the actually measured specific surface area of the crimped carbon fiber of the present invention is about 1.5 times or more, preferably about 2 times or more, more preferably about 3 times or more, the specific surface area in terms of fiber diameter.

Specific surface area in terms of fiber diameter(m$^2$/g)= 2,000/fiber outer diameter(nm)  (2)

When the specific surface area is large, the number of supporting sites on use as a catalyst increases and a good catalyst support can be obtained. Also, by virtue of the large specific surface area, hydrogen gas, methane or the like can be adsorbed in a large amount and a material suitable as a hydrogen-storing material or an occluding material for various gases can be obtained.

According to the present invention, a crimped carbon fiber having such a high aspect surface area can be directly synthesized without using a special post treatment such as surface treatment and therefore, the profitability is very high.

(Production Method)

The crimped carbon fiber of the present invention can be produced by a vapor phase process. More specifically, at the time of producing a vapor grown carbon fiber by contacting a carbon compound with a catalyst in a heating zone in the presence of a carrier gas containing a reducing gas, the production conditions are strictly controlled as described below, whereby the crimped carbon fiber of the present invention can be produced. Individual production conditions vary depending on the reaction apparatus, carbon compound, catalyst and the like used and cannot be indiscriminately determined, but one preferred example is described below.

(Carbon Compound)

For the carbon compound as a raw material of the carbon fiber, for example, $CCl_4$, $CHCl_3$, $CH_2Cl_2$, $CH_3Cl$, CO, $CO_2$ and $CS_2$ can be suitably used. In addition, organic compounds in general other than these can also be used. Examples of highly useful carbon compounds include inorganic gases such as CO and $CO_2$; alkanes such as methane, ethane, propane, butane, pentane, hexane, heptane and octane; alkenes such as ethylene, propylene and butadiene; alkynes such as acetylene; monocyclic aromatic hydrocarbons such as benzene, toluene, xylene and styrene; polycyclic compounds having a condensed ring, such as indene, naphthalene, anthracene and phenanthrene; cycloparaffines such as cyclopropane, cyclopentane and cyclohexane; cycloolefins such as cyclopentene, cyclohexene, cyclopentadiene and dicyclopentadiene; and alicyclic hydrocarbon compounds having a condensed ring, such as steroid.

Furthermore, derivatives containing oxygen, nitrogen, sulfur, phosphor, halogen or the like in these hydrocarbons can also be used, for example, oxygen-containing compounds such as methanol, ethanol, propanol, butanol, sulfur-containing aliphatic compounds such as methylthiol, methylethylsulfide and dimethylthioketone; sulfur-containing aromatic compounds such as phenylthiol and diphenylsulfide; sulfur- or nitrogen-containing heterocyclic compounds such as pyridine, quinoline, benzothiophene and thiophene; hydrocarbon halides such as chloroform, carbon tetrachloride, chloroethane and trichloroethylene; and, although not a simple substance, natural gas, gasoline, kerosine, heavy oil, creosote oil, terpine oil, camphor oil, pine oil, gear oil and cylinder oil. These can be of course used as a mixture. The sulfur-containing compounds described here are a carbon source and at the same time, acts as a sulfur source which is described later.

Among these carbon compounds, in view of carbon fiber-producing capability and cost, preferred are CO, $CO_2$, methane, ethane, propane, butane, pentane, hexane, cyclohexane, ethylene, propylene, butadiene, acetylene, benzene, toluene, xylene and a mixture thereof.

(Catalyst)

The catalyst which can be used for the production method of the present invention is not particularly limited as long as it is a substance of accelerating the growth of carbon fiber. Preferred examples of the catalyst include catalysts containing at least one metal selected from the group consisting of Groups 3 to 12 in the 18 Group-type Periodic Table of the Elements recommended by IUPAC in 1990. Among these, more preferred are catalysts containing at least one metal selected from the group consisting of Groups 3, 5, 6, 8, 9 and 10, still more preferred are catalysts containing iron, nickel, cobalt, ruthenium, rhodium, palladium, platinum or a rare earth element.

(Catalyst Precursor Compound)

In place of or in combination with the above-described catalyst, a catalyst precursor compound capable of undergoing thermal decomposition in the heating zone and depending on the case, being further reduced to give the above-described catalyst can also be used as a starting material. The "catalyst" as used in the claims include this catalyst precursor compound.

For the catalyst precursor compound, compounds of giving the metal described in the "Catalyst" above can be preferably used. More specifically, metal compounds containing at least one element selected from the group consisting of Groups 3 to 12 of the 18 Group-type Periodic Table of the Elements are preferred, compounds containing at least one element selected from the group consisting of Groups 3, 5, 6, 8, 9 and 10 are more preferred, and compounds containing iron, nickel, cobalt, ruthenium, rhodium, palladium, platinum or a rare earth element are most preferred.

Also, a metal compound containing at least one element selected from the group consisting of Groups 1 to 17 may be added as a modification component (so-called co-catalyst) to the above-described main component to modify the catalytic performance of metal which is the main component.

Ferrocene which is one example of the catalyst precursor compound undergoes thermal decomposition in the heating zone and produces a catalyst iron fine particle.

In the case where a carbon-containing substance such as organic material is used as the catalyst precursor, this substance itself has an effect as the carbon source at the same time and therefore, a carbon source need not be separately used.

(Support)

The catalyst and/or catalyst precursor compound may be used by loading it on a support, if desired. The support is preferably a compound stable in the heating zone and examples of such a compound include alumina, silica, zeolite, magnesia, titania, zirconia, graphite, active carbon and carbon fiber.

(Amount Used of Catalyst or the Like)

The amount of the catalyst or catalyst precursor compound used is, in terms of the ratio of the molar number of catalyst metal to the molar number of carbon in the carbon compound, preferably from about 0.000001 to about 1, more preferably from about 0.00001 to about 0.1, and optimally from about 0.0001 to about 0.005. If the molar number ratio is less than about 0.000001, the catalyst runs short and this may disadvantageously cause decrease in the number of carbon fibers or increase in the outer diameter of carbon fiber, whereas if the molar number ratio exceeds 1, this is unprofitable and also not preferred because a catalyst particle failing in functioning as the catalyst tends to become a coarse particle and mix in carbon fibers. In the calculation of the molar number ratio of carbon atom in the carbon compound, carbon atoms not only present in the carbon compound but also originated in the catalyst precursor compound or solvent are included.

(Sulfur Compound)

One characteristic feature of the production method of crimped carbon fiber of the present invention is to use a sulfur compound in combination. Heretofore, a sulfur compound has been used for the purpose of, for example, adjusting the fiber outer diameter or the like and as for the amount added thereof, the molar number of metal used as the catalyst and the molar number of sulfur are usually about equivalent or less. In conventional cases where the sulfur compound is used in a largely excessive amount as in the present invention, the form, carbon structure, specific surface area and the like of fiber produced are not clarified. In the present invention, it has been found that when sulfur is used in a largely excessive amount, the carbon fiber obtained has a peculiar structure and is useful. In the present invention, a sulfur source is used in a largely excessive amount which is unimaginable in normal cases, whereby the crimped carbon fiber of the present invention can be obtained. The mechanism of producing the crimped fiber of the present invention in the largely excessive sulfur region is not clearly known but is presumed as follows. Due to the presence of sulfur in a large amount for the metal catalyst, the frequency of sulfur atom contacting with the catalyst metal particle in the reaction system increases and accompanying this, the sulfur forms a solid solution with the catalyst metal or readily causes physical or chemical adsorption to the catalyst metal surface and this brings about change of composition or state in the catalyst or on the catalyst surface, as a result, a carbon fiber in an unusual form is produced.

The sulfur compound is not particularly limited but preferred examples thereof include inorganic sulfur compounds such as sulfur, hydrogen sulfide, carbon disulfide and various sulfides and sulfates, and organic sulfur compounds such as thiols, disulfides, sulfides, sulfoxides, sulfones, sulfonium salts, sulfonium imides, sulfenic acids, sulfinic acids, sulfonic acids, thiol sulfinates, thiol sulfonates, azasulfonium salts, sulfilimines, sulfoxyimines, sulfenyl derivatives, sulfinyl derivatives, sulfonyl derivatives, thiophene derivatives and benzothiophene derivatives. Among these compounds, more preferred are thiophene, methylthiophene, ethylthiophene, tetrahydrothiophene, tetrachlorothiophene, bromothiophene, thianorbiphenylene, ethyl thiophene-2-carboxylate, benzothiophene, methylbenzothiophene, methyl 3-aminobenzothiophene-2-carboxylate, 3-phenylbenzothiophene-2-carboxylic acid, alkyl thiols (e.g., ethanethiol, ethanedithiol, propanethiol, butanethiol, decanethiol, dodecanethiol), benzothiol, nitrophenylthiol, toluenethiol, dimercaptobenezene, mercaptoethanol, mercaptomethanol, mercaptophenol, mercaptoacetic acid, mercaptobenzoic acid, mercaptopropionic acid, mercaptosuccinic acid, dimethyl sulfide, dibutyl sulfide, dibenzyl sulfide, methyloctyl sulfide, benzylalkyl sulfide, diphenyl sulfide, diphenyl disulfide, methylphenylsulfoxide, benzylpyridylsulfoxide, methylmethylthiomethylsulfoxide, phenylvinylsulfone, dibutylsulfone, pentamethylenesulfone, dimethylphenylsulfonyl methylsulfonate, benzyl p-tolylsulfone and dimethylphenyl methylsulfone, and most preferred are sulfur, thiophene and hydrogen sulfide. The sulfur compound may be formed into a gas state and used as one component of the carrier gas or may be supplied after dissolving it in a solvent. Of course, a sulfur-containing substance may be used in the carbon compound or catalyst precursor compound.

The ratio of the molar number of sulfur atom in the supplied sulfur source to the molar number of catalyst metal atom is preferably about 2.0 or more, more preferably from about 2.0 to about 25, still more preferably 3.5 or more, yet still more preferably from about 3.5 to about 25, and particularly preferably from 3.5 to about 20, but in some cases, the ratio is preferably about 5 or more.

The total molar number of sulfur supplied is preferably about 0.0001 mol/NL or more, more preferably about 0.0003 mol/NL or more, in terms of vapor-phase concentration in the reactor. The vapor-phase concentration as used herein is a value obtained by dividing the molar number of sulfur added (molar number as sulfur atom) by the volume of, out of the components supplied to the reactor, those which are a gas in the standard state. If the vapor-phase concentration of sulfur is too low, this disadvantageously causes not only failure in producing the crimped fiber but also production of linear fiber or spherical carbon particle.

Incidentally, when an organic sulfur compound such as thiophene is used as the sulfur source, this compound has an effect as the carbon source at the same time and therefore, a carbon source in particular need not be used separately.

(Addition Component)

An addition component described below may be further added, if desired, whereby a crimped fiber having a peculiar carbon structure as specified in claims can be produced. Furthermore, use of such an addition component is advantageous in that the specific surface area of crimped fiber increases and the throughput also tends to increase.

Needless to say, the carbon content in such an addition component has an effect as the carbon source at the same time and a carbon source in particular need not be used separately.

The addition component is preferably an organic compound in which the lower of the boiling point at 1 atm and the decomposition temperature is about 180° C. or more, or an organic compound polymer having a molecular weight of about 200 or more. The decomposition temperature as used herein is defined by a temperature where a weight decrease of 50% is generated when about 10 mg of a sample is temperature-elevated at 10° C./min in an inert gas atmosphere such as nitrogen by using a thermogravimetric analyzer.

Examples of such an addition component include at least one organic compound selected from the group consisting of saturated or unsaturated hydrocarbons having 10 or more carbon atoms, higher alcohols, olefins, halogenated ethylenes, dienes, acetylene derivatives, styrene derivatives, vinyl ester derivatives, vinyl ether derivatives, vinyl ketone derivatives, acrylic acid and methacrylic acid derivatives, acrylic acid ester derivatives, methacrylic acid ester derivatives, acrylamide and methacrylamide derivatives, acrylonitrile and methacrylonitrile derivatives, maleic acid and maleimide derivatives, vinylamine derivatives, phenol derivatives, melamines and urea derivatives, amine derivatives, carboxylic acid and carboxylic acid ester derivatives, diol and polyol derivatives, and isocyanate and isothiocyanate derivatives, and a polymer thereof.

More preferred examples of the compound as the addition component include octyl alcohol, decyl alcohol, cetyl alcohol, stearyl alcohol, oleic acid, stearic acid, adipic acid, linoleic acid, erucic acid, behenic acid, myristic acid, lauric acid, capric acid, caprylic acid, hexanoic acid, their sodium and potassium salts, dimethyl malonate, dimethyl maleate, dibutyl phthalate, ethylhexyl phthalate, diisononyl phthalate, diisodecyl phthalate, diundecyl phthalate, ditridecyl phthalate, dibutoxyethyl phthalate, ethylhexylbenzyl phthalate, ethylhexyl adipate, diisononyl adipate, diisodecyl adipate, dibutoxyethyl adipate, ethylhexyl trimellitate, polyethylene glycol, polypropylene glycol, polyoxyethylene glycol monomethyl ether, polyoxyethylene glycol dimethyl ether, polyoxyethylene glycol glycerin ether, polyoxyethylene glycol lauryl ether, polyoxyethylene glycol tridecyl ether, polyoxyethylene glycol cetyl ether, polyoxyethylene glycol stearyl ether, polyoxyethylene glycol oleyl ether, polypropylene glycol diallyl ether, polyoxyethylene glycol nonylphenyl ether, polyoxyethylene glycol octyl ether, polypropylene glycol stearate, sodium di-2-ethylhexylsulfosuccinate, polyethylene oxide, polypropylene oxide, polyacetal, polytetrahydrofuran, polyvinyl acetate, polyvinyl alcohol, polymethyl acrylate, polymethyl methacrylate, polyethylene, polypropylene, polyvinyl chloride, polyvinylidene chloride, polyurethane, unsaturated polyester, epoxy resin, phenol resin, polycarbonate, polyamide, polyphenylene oxide, polyacrylonitrile and polyvinylpyrrolidone.

(Production Method of Carbon Fiber)

The production method for the crimped carbon fiber of the present invention is not particularly limited as long as it is a technique generally used for the synthesis of carbon fiber by a vapor-phase process. In view of versatility and profitability, for example, a reaction apparatus as shown in FIG. 8 can be suitably used.

In a vertical annular heating furnace 6, a reaction tube 5 made of quartz or ceramic such as silicon carbide is disposed and from the inlet part, a previously mixed carrier gas is introduced. As for the carrier gas, hydrogen, nitrogen, helium, argon, krypton or a mixed gas thereof can be used. The carrier gas is preferably a gas containing hydrogen in a concentration of about 1 mol % or more, more preferably about 30 mol % or more, still more preferably about 85 mol % or more.

The method for feeding the catalyst source, raw material hydrocarbon, sulfur source and addition component can be appropriately selected according to their form. The raw material carbon compound and sulfur source are preferably supplied, when these are a gas at an ordinary temperature, by mixing them each in the gas form with the carrier gas, and when these are a liquid, by vaporizing and then mixing them with the carrier gas or by atomizing them each in the liquid state in the heating zone. When a supported catalyst is used as the catalyst, the raw material carbon compound and the like are preferably supplied after previously disposing the supported catalyst in a heating zone (reaction zone) and heating it to perform a necessary pretreatment. It is more preferred to continuously or pulsedly feed a pretreated supported catalyst from the outside of the system.

The feeding is most preferably performed by a method of dissolving the catalyst or catalyst precursor compound, the sulfur source and the addition component in the liquid raw material carbon compound or in an appropriate solvent and continuously or pulsedly feeding the obtained solution to the heating zone or by a method of continuously or pulsedly feeding the catalyst or catalyst precursor compound and the sulfur source each in the vaporized or solid state as it is directly to the heating zone.

(Reactor)

Figure 7:
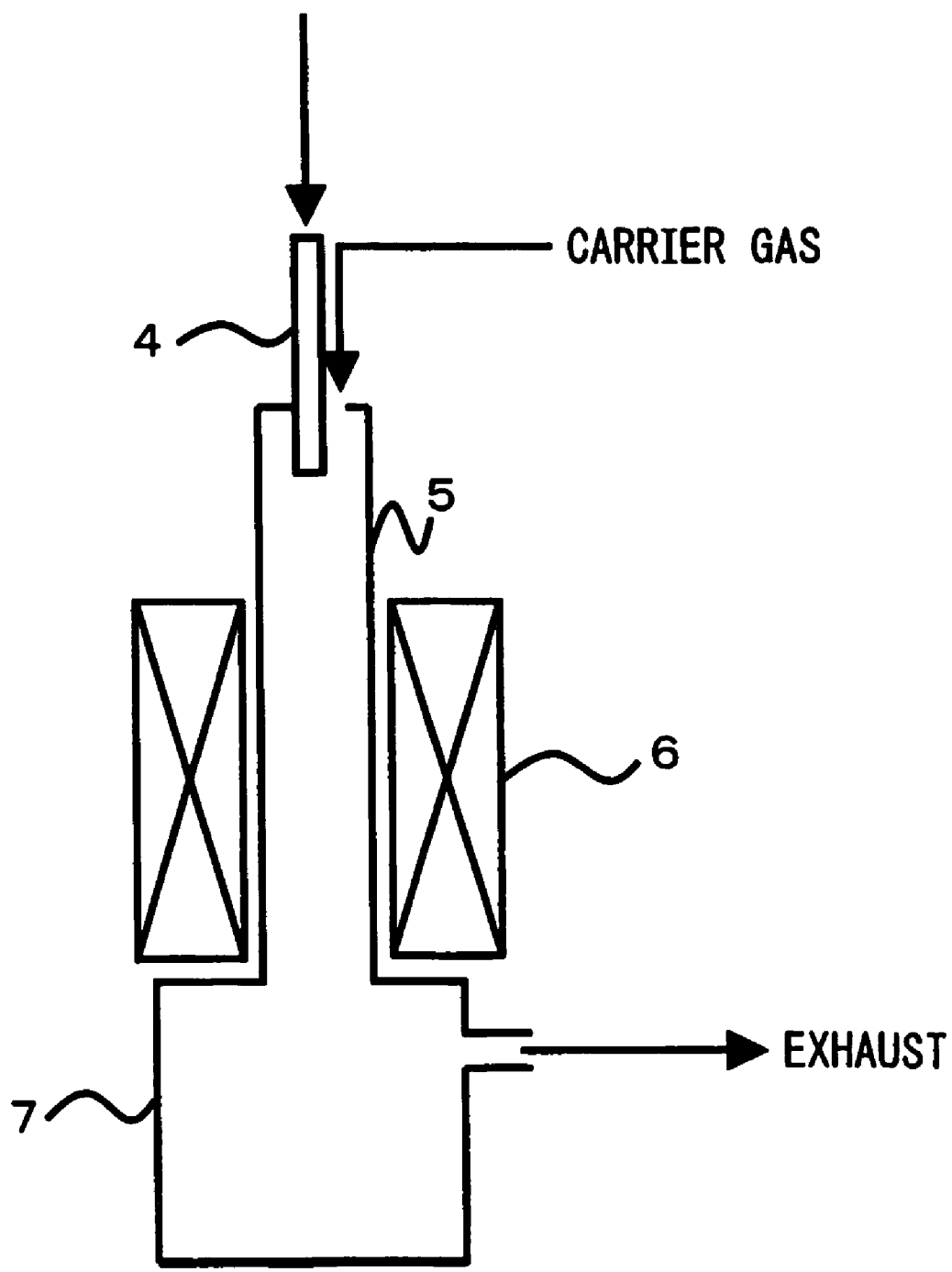
FIG. 7 is a schematic view showing one example of a vertical reaction furnace.

The reactor system is also not particularly limited and a reactor commonly used for the production of a carbon fiber can be used as long as predetermined heating zone temperature and residence time can be obtained. In view of versatility and profitability, a vertical reactor as shown in FIG. 7 or a horizontal reactor is particularly preferred.

(Heating Zone Temperature)

The temperature in the heating zone greatly varies depending on the kind of carbon compound used, but generally, this temperature is preferably from about 600 to about 1,500° C., more preferably from about 800 to about 1,350° C., and optimally from more than about 1,200° C. to about 1,350° C. If the temperature is too low, the yield becomes low, whereas if it is excessively high, a spherical carbon particle and the like are readily produced.

(Residence Time)

In the present invention, the residence time in the heating zone can be adjusted by the length of heating zone and the flow rate of carrier gas. The preferred residence time may greatly vary depending on the reaction apparatus used and the kind of carbon compound used, but generally, this is preferably from about 0.0001 second to about 2 hours, more preferably from about 0.001 to about 100 seconds, and most preferably from about 0.01 to about 30 seconds. If the residence time is too short, the carbon fiber may not satisfactorily grow, whereas if the residence time is excessively long, many thick fibers tend to be formed.

(Heat Treatment)

The crimped carbon fiber of the present invention is usually obtained by a vapor-phase thermal decomposition method and the obtained product may be used as it is or the crimped carbon fiber obtained may be further subjected to a heat treatment. In the heat treatment, the product obtained by the vapor-phase thermal decomposition method or the like is fired under heating at about 800 to about 1,500° C. in a non-oxidative atmosphere such as argon. By this treatment, volatile components such as tar content are removed and particularly in the case of a crimped carbon fiber containing a plate-like fiber in the inner layer part, the proportion of a fiber having a folded and/or ringed structure in the inner layer part tends to increase.

This heat-treated carbon fiber may be further subjected to a heat treatment at about 2,000 to about 3,000° C. in a non-oxidative atmosphere such as argon. By this treatment, graphitization proceeds and crystallization of the carbon network layer proceeds. In particular, in the case of a crimped carbon fiber containing a plate-like fiber in the inner layer part, the proportion of a fiber having a folded and/or ringed structure in the inner layer part increases and the fiber having a plate-like inner layer part completely disappears or if present, its proportion is very small.

The crimped carbon fiber may also be mixed with a boron compound or may be heat-treated at about 2,000 to about 3,500° C. in the presence of a boron compound, for example, by contacting the carbon fiber with a gas of boron compound. In this boron treatment, a carbon fiber heat-treated at about 1,500° C. or less and insufficient in the mature of crystal is preferably used. As a result of this treatment, the crimped carbon fiber may contain boron or a boron compound.

(Uses)

The crimped carbon fiber of the present invention can remarkably enhance the performance of a material by blending it in the material (matrix component) such as ceramic, metal and resin.

The crimped carbon fiber of the present invention is also useful for enhancing the mechanical strength of a material. In this case, a crimped carbon fiber in an effective amount for obtaining the desired mechanical strength is blended in the material.

The crimped carbon fiber of the present invention is also useful for enhancing the electric conductivity of a material. In this case, a crimped carbon fiber in an effective amount for obtaining the desired electric conductivity is blended in the material.

The crimped carbon fiber of the present invention is also useful for enhancing the thermal conductivity of a material. In this case, a crimped carbon fiber in an effective amount for obtaining the desired thermal conductivity is blended in the material.

The crimped carbon fiber of the present invention is also useful for shielding a material from electromagnetic radiation. In this case, a crimped carbon fiber in an effective shielding amount is blended in the material.

Examples of the matrix component include an elastomer, a thermoplastic resin and a thermosetting resin. Specific preferred examples of the matrix component include polyamide, polystyrene, polycarbonate, polyester, polyether, polyimide, polyphenylene, polyethylene terephthalate, polyarylate, polyether ether ketone, polyoxybenzoyl, polyetherimide, polyurethane, epoxy resin, phenol resin and silicone resin. In particular, for the purpose of enhancing the thermal conductivity, when the crimped carbon fiber is blended in silicone oil, silicone resin or the like, this is useful as a thermal conductive paste material for heat radiation, an adhesive or a rubber sheet.

Other examples of the matrix component include an inorganic polymer, a ceramic material, a polymer inorganic oxide and a carbon material. Specific examples thereof include glass fiber, plate glass, other shaped glasses, silicate ceramics, and refractory ceramics such as aluminum oxide, silicon carbide, silicon nitride, zirconium oxide, mullite and cordierite.

As still another example, a metal may also be used as the matrix component. Preferred examples of the metal include aluminum, magnesium, lead, copper, tungsten, titanium, niobium, hafnium, vanadium and an alloy or mixture containing at least one of these metals. In particular, when the crimped carbon fiber of the present invention is blended in aluminum, magnesium or the like or in an alloy or mixture containing at least one of these metals, a lightweight high-strength metal material can be obtained.

Furthermore, the crimped carbon fiber of the present invention is useful for various uses other than those described above. One example thereof is a method of mixing the crimped carbon fiber of the present invention in an electrode or electrolytic capacitor plate to increase the surface area of the electrode or plate. Also, when blended in an electrode for various secondary batteries such as lithium ion battery and lead storage battery, properties such as battery capacity can be enhanced.

The crimped carbon fiber of the present invention has a very large specific surface area and therefore, can be used as an adsorption medium for various gases such as hydrogen and methane. In particular, this carbon fiber is suitable as a hydrogen-storing material used for fuel cell and the like.

Also, an appropriate catalyst can be supported on the crimped carbon fiber of the present invention. The carbon fiber of the present invention has high specific surface area and high activity even without applying any particular treatment and need not be subjected to a pretreatment usually applied on using a carbon fiber as the catalyst support and therefore, it is economical. Examples of the use as the catalyst include a platinum catalyst for fuel cell and an environmental catalyst for SOx or NOx abatement.

In addition, the crimped carbon fiber of the present invention can also be suitably used as an electron-emitting material for FED (field emission display), for example, by vertically orienting the carbon fibers on a substrate or the like.

EXAMPLES

The present invention is described in greater detail below by referring to Examples, but the present invention is not limited thereto.

[Reagents]

1. Carbon Compound

Benzene:
  guaranteed reagent, produced by Wako Pure Chemical Industries, Ltd.

Cyclohexane:
  guaranteed reagent, produced by Wako Pure Chemical Industries, Ltd.

2. Catalyst Precursor Compound

Ferrocene: Produced by Nippon Zeon Co., Ltd.

3. Sulfur Source

Powder Sulfur:
  reagent, produced by Kanto Chemical Co., Inc. Thiophene:
  guaranteed reagent, produced by Wako Pure Chemical Industries, Ltd.

4. Addition Component

Polypropylene Glycol:
  D-400 (molecular weight: 400, decomposition temperature: 290° C.), produced by NOF Corporation Liquid Paraffin:
  reagent, produced by Wako Pure Chemical Industries, Ltd.

[Measurement of Specific Surface Area]

The specific surface area was calculated by the BET method with use of a BET specific surface area analyzer (CHEMBET-3000) manufactured by Yuasa Ionics from a nitrogen adsorption number after degassing at 250° C. for 15 minutes in a nitrogen stream.

[Measurement of Decomposition Temperature]

In the measurement of the decomposition temperature of the addition component, about 10 mg of a sample was heated to 600° C. at a temperature-rising rate of 10° C./min while passing a nitrogen gas at a flow rate of 200 ml/min and the temperature when a weight decrease of 50 mass % was generated was read by a differential thermal analyzer (DTA-TG SSC/5200, manufactured by Seiko Instruments) and used as the decomposition temperature.

[Synthesis of Carbon Fiber]

Example 1

In a vertical furnace equipped with a quartz-made reaction tube 5 (inner diameter: 31 mm, outer diameter: 36 mm, heating zone length: about 400 mm), shown in FIG. 7, the temperature was elevated to 1,250° C. in an $N_2$ stream. Thereafter, the feed of $N_2$ was stopped and instead, $H_2$ was passed as the carrier gas into the reaction tube. After the temperature was stabilized, the raw material composition shown in Table 1 was fed from a raw material atomization nozzle 4 for 10 minutes by using a small pump. In the table, the composition charged is shown by mass % in the benzene solution.

Figure 1B:
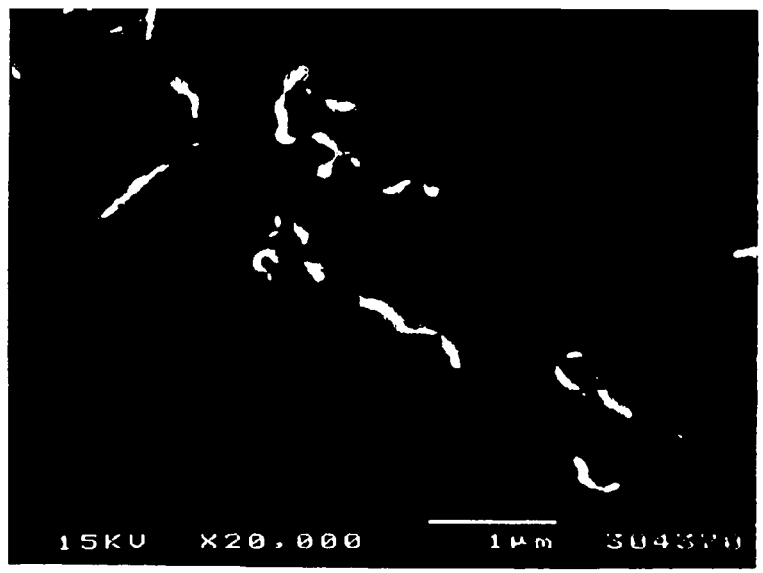
Figure 2:
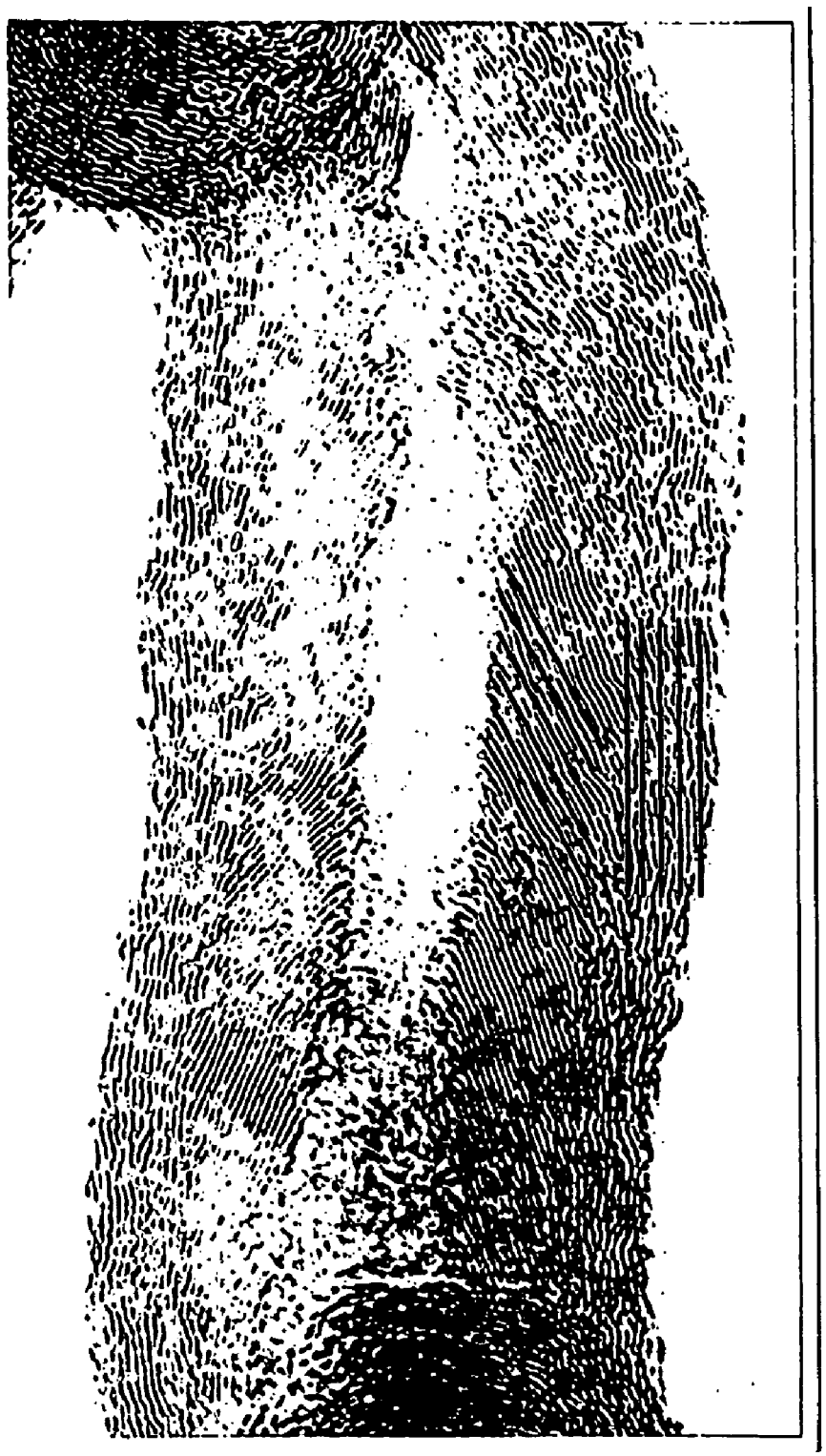
FIG. 2 is a transmission electron microphotograph of the crimped carbon fiber produced in Example 1 (a herringbone-type inner layer part).
Figure 3A:
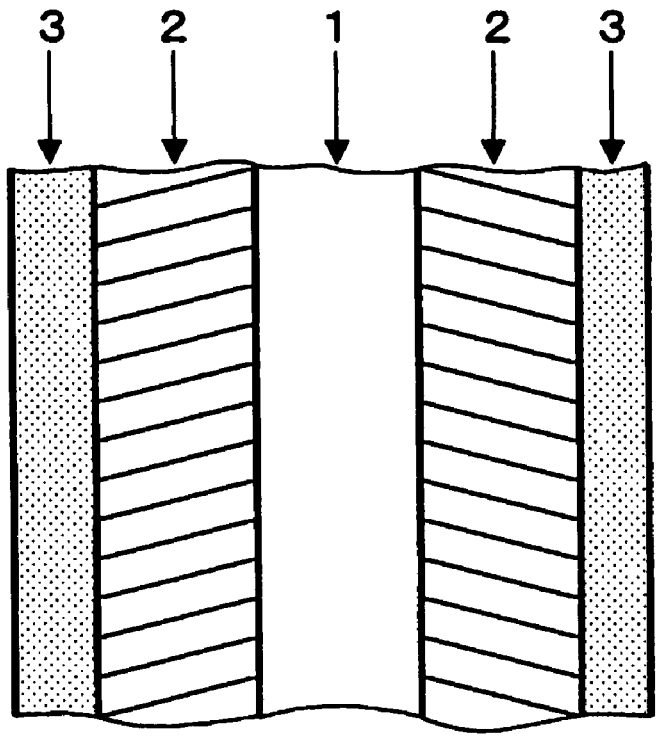
FIGS. 3A and 3B are schematic views of the crimped carbon fiber produced in Example 1 (a cross-sectional view of a fiber having a herringbone-type inner layer part).
Figure 3B:
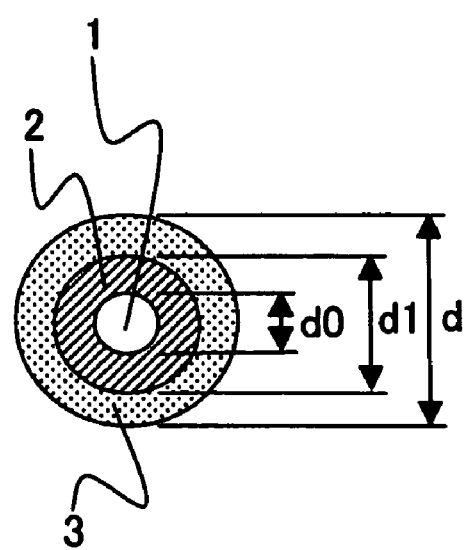
Figure 6:
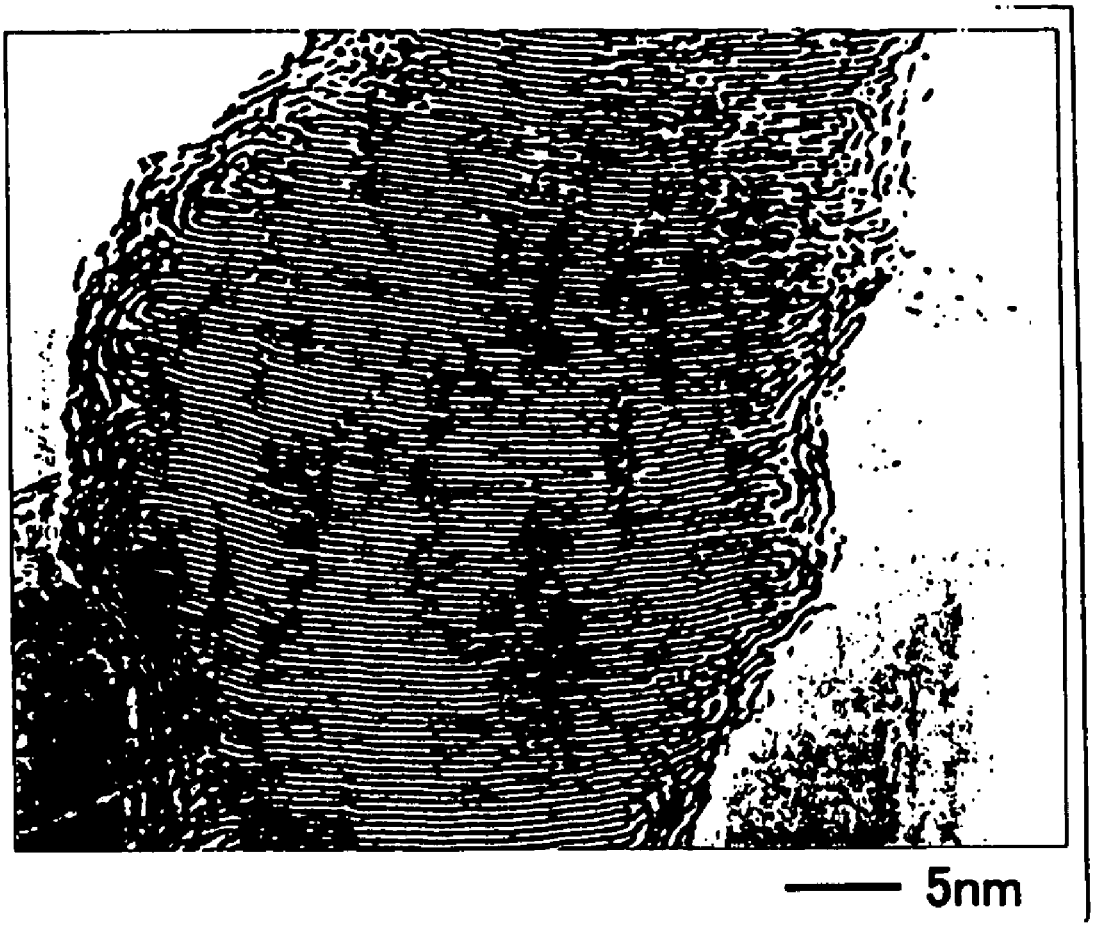
FIG. 6 is a transmission electron microphotograph of the crimped carbon fiber produced in Example 1 (the center part has a plate-like folded structure).

As a result of reaction, a black product was produced in the reaction tube and in the recovery vessel. After lowering the temperature, the product was recovered and the percentage recovery was determined by dividing the amount recovered by the total carbon amount in raw materials. Also, the product in the recovery vessel was observed by a scanning electron microscope (SEM; Model JEOL JSM-T330A, manufactured by Nihon Denshi K. K.) and by a transmission electron microscope (TEM; Model H-2200, manufactured by Hitachi Ltd.). FIGS. 1A and 1B each shows one example of the scanning electron microphotograph. As for the fiber outer diameter, fiber length and percentage crimp, about 100 fibers were measured from scanning electron microphotographs at a magnification of 20,000 to 100,000 and respective average values are shown in Table 1. In the measurement of the fiber outer diameter, a large fluctuation was present even in the same fiber and therefore, several points of the same fiber were measured, the average thereof was used as a representative value of the fiber and an average of representative values of about 100 fibers was determined. FIGS. 2, 4 and 6 each shows a transmission electron microphotograph.

As seen in the scanning electron microphotographs of FIGS. 1A and 1B, the carbon fiber is crimped. In the transmission electron microphotograph of FIG. 2, a carbon fiber having a hollow structure in the inside is observed, where the carbon structure of the inner layer part contains a herringbone structure and the carbon structure of the outer layer part is a tree-growth-ring structure and differs from the inner layer part. In the transmission electron microphotograph of FIG. 4, a carbon fiber not having a hollow structure in the inside is observed, where the carbon structure of the inner layer part is a plate-like structure and the carbon structure of the outer layer part is a tree-growth-ring structure and differs from the inner layer part. In the transmission electron microphotograph of FIG. 6, a carbon fiber not having a hollow structure in the inside is observed, where the carbon structure of the inner layer part is a carbon layer-folded and/or ringed structure and the carbon structure of the outer layer part is a tree-growth-ring structure and differs from the inner layer part. The carbon fiber of this Example is a mixture of these carbon fibers.

Examples 2 to 5

The production was performed in the same manner as in Example 1, except for changing the reaction solution composition and the feed amount of reaction solution as shown in Table 1.

In Example 2, the outer appearance was crimped similarly to Example 1, but main carbon fibers had a carbon structure that a hollow structure was present in the inside, the carbon structure of the inner layer part was containing a herringbone structure and the carbon structure of the outer layer part was a tree-growth-ring structure and differing from the inner layer part.

In Examples 3 to 5, the outer appearance was crimped similarly to Example 1. The carbon fibers observed were (i) a carbon fiber having a carbon structure in which a hollow structure was present in the inside, the carbon structure of the inner layer part contained a herringbone structure and the carbon structure of the outer layer part was a tree-growth-ring structure and differing from the inner layer part; (ii) a carbon fiber having a carbon structure that a hollow structure was not present in the inside, the carbon structure of the inner layer part was a plate-like structure and the carbon structure of the outer layer part was a tree-growth-ring structure and differing from the inner layer part; and (iii) a carbon fiber having a carbon structure that a hollow structure was not present in the inside, the carbon layer group of the inner layer part was forming a folded and/or ringed structure and the carbon structure of the outer layer part was a tree-growth-ring structure and differing from the inner layer part. In Examples 4 and 5, the proportion of the fiber (i) was relatively large.

Example 6

The carbon fiber obtained in Example 1 was treated at 1,100° C. for 10 minutes in an argon stream. The fiber outer diameter and fiber length were not changed between before and after the treatment. The specific surface area was 100 m²/g and not changed from that before treatment. The outer appearance of the carbon fiber was crimped and not changed between before and after the treatment. The carbon structure was the same as that before the treatment and the carbon fiber was a mixture of (i) a carbon fiber having a carbon structure in which a hollow structure was present in the inside, the carbon structure of the inner layer part contained a herringbone structure and the carbon structure of the outer layer part was a tree-growth-ring structure and differing from the inner layer part; (ii) a carbon fiber having a carbon structure that a hollow structure was not present in the inside, the carbon structure of the inner layer part was a plate-like structure and the carbon structure of the outer layer part was a tree-growth-ring structure and differing from the inner layer part; and (iii) a carbon fiber having a carbon structure that a hollow structure was not present in the inside, the carbon layer group of the inner layer part was forming a folded and/or ringed structure and the carbon structure of the outer layer part was a tree-growth-ring structure and differing from the inner layer part. When compared with the product before treatment (Example 1), the proportion of the carbon fiber (ii) was relatively decreased and the proportion of the carbon fiber (iii) was relatively increased.

Example 7

The carbon fiber obtained in Example 6 was further treated at 2,800° C. for 10 minutes in an argon stream. The fiber outer diameter and fiber length were not changed between before and after the treatment. The specific surface area was 100 m²/g and not changed from that before treatment. The outer appearance of the carbon fiber was crimped and not changed between before and after the treatment. As for the carbon structure, the carbon fiber was a mixture of (i) a carbon fiber having a carbon structure in which a hollow structure was present in the inside, the carbon structure of the inner layer part contained a herringbone structure and the carbon structure of the outer layer part was a tree-growth-ring structure and differing from the inner layer part; and (iii) a carbon fiber having a carbon structure that a hollow structure was not present in the inside, the carbon layer group of the inner layer part was forming a folded and/or ringed structure and the carbon structure of the outer layer part was a tree-growth-ring structure and differing from the inner layer part. As seen in the transmission electron microphotograph of FIG. 8, respective carbon network layers were clearly confirmed. FIG. 9 shows a schematic view of the carbon fiber of FIG. 8.

Comparative Example 1 to 3

The production was performed in the same manner as in Example 1 under the conditions shown in Table 1. From the observation by a transmission electron microscope, these fibers all were confirmed to have a tree-growth-ring carbon stacked structure. Incidentally, in Comparative Example 1, a large vertical electric furnace was used and an SiC-made reaction tube (inner diameter: 360 mm, heating zone length: 2,000 mm) was used.

Example 8

The carbon fiber obtained in Example 6 was evaluated by X-ray diffraction to reveal that a lattice spacing (d002) of a hexagonal carbon layer, (002)-plane, was 0.337 nm. Also, a ratio (Id/Ig) between a peak height (Id) in a band of 1340-1349 $cm^{-1}$ and a peak height (Ig) in a band of 1570-1578 $cm^{-1}$ of Raman spectrum, was measured to be 0.5.

Comparative Example 4

The carbon fiber obtained in Comparative Example 1 was evaluated in the same manners as in Example 8 to reveal that d002 was 0.339 nm and Id/Ig was 0.2.

In Examples 1 to 7, the sulfur concentration fed to the heating zone of the reactor was increased, whereby the crimped carbon fiber of the present invention could be obtained. In Example 1 and 3, an addition component such as polypropylene glycol or liquid paraffin was added and this was verified to cause increase in the percentage recovery of carbon fiber and the BET specific surface area and in the amount produced of a carbon fiber where a hollow structure was not present in the inside, the carbon structure of the inner layer part was a plate-like structure and the carbon structure of the outer layer part was a tree-growth-ring structure and differing from the inner layer part. In Example 4, even when cyclohexane was used as the carbon source, a crimped fiber equal to those of Examples 1 to 3 could be obtained. In Example 5, a crimped long fiber having a relatively large aspect ratio could be obtained. In Examples 6 and 7, it was verified that the heat treatment causes increase in the amount produced of a crimped short fiber where the carbon layer group of the inner layer part was forming a folded and/or ringed structure.

INDUSTRIAL APPLICABILITY

The crimped carbon fiber of the present invention has a crimped shape and therefore, readily takes a network structure in a matrix such as metal, resin and plastics, so that a high-strength composite material having high thermal conductivity and high electric conductivity can be obtained. Furthermore, the crimped carbon fiber of the present invention has a very large specific surface area for the fiber outer diameter and therefore, exerts excellent capability of adsorbing hydrogen gas, methane or the like, so that this can be suitably used as a hydrogen-storing material, a material for occluding various gases, or a catalyst support. In addition, a fiber having a short fiber length can be easily obtained without applying an acid treatment or a grinding treatment and therefore, a fiber easy to disperse in metal, resin or ceramic can be obtained at a low cost.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Reaction solution composition (wt %) | | | | | | | | |
| Benzene | 36 | 50 | 36 | | | 94 | 84 | 93 |
| Cyclohexane | | | | 50 | 22 | | | |
| Ferrocene | 6 | 5 | 6 | 3 | 5 | 6 | 3 | 5 |
| Thiophene | 10 | 45 | 10 | 47 | 73 | | | 2 |
| Powder sulfur | | | | | | 0.4 | 0.9 | |
| D-400 | 48 | | | | | | 12 | |
| Liquid paraffin | | | 48 | | | | | |
| Feed amount of reaction solution (g/min) | 0.3 | 0.2 | 0.3 | 0.3 | 0.3 | 19 | 0.3 | 0.16 |
| Carrier hydrogen (L/min) | 1 | 1 | 1 | 1 | 1 | 100 | 1 | 1 |
| Sulfur concentration in vapor phase (mol/NL) | 0.00036 | 0.001 | 0.00036 | 0.002 | 0.003 | 0.00002 | 0.00008 | 0.00004 |
| S/Fe (mol/mol) | 3.7 | 19.9 | 3.7 | 34.7 | 32.3 | 0.4 | 1.5 | 0.9 |
| Percentage recovery (wt %) | 68 | 61 | 79 | 77 | 83 | 42 | 62 | 43 |
| Fiber diameter (nm) | 70 | 80 | 64 | 53 | 74 | 79 | 155 | 95 |
| Fiber length (μm) | 1 | 0.5 | 0.7 | 1.1 | 7 | 6 | 20 | 20 |
| Aspect ratio | 14 | 7 | 11 | 21 | 95 | 73 | 129 | 211 |
| BET Specific surface area ($m^2/g$) | 100 | 45 | 92 | 72 | 127 | 33 | 17 | 30 |
| Specific surface area in terms of fiber diameter | 29 | 25 | 31 | 38 | 27 | 25 | 13 | 21 |
| Percentage crimp (%) | 44 | 24 | 11 | 16 | 27 | 0 | 0 | 0 |
| Shape of fiber | crimped | crimped | crimped | crimped | crimped | linear | linear | linear |

The invention claimed is:

1. A crimped carbon fiber having a multilayer structure comprising an inner layer part and an outer layer part with a hollow structure in the inside thereof, the inner layer part having a carbon structure containing a herringbone structure, the outer layer part having a carbon structure differing from the carbon structure of the inner layer part.

2. A crimped carbon fiber having a multilayer structure comprising a center part and an outer layer part outside the center part with no hollow structure inside thereof, the center part having a carbon structure containing a shape that carbon layers vertical to the carbon fiber axis are stacked, the outer layer part having a carbon structure differing from the carbon structure of the center part.

3. The crimped carbon fiber as claimed in claim 2, wherein the carbon layers vertical to the carbon fiber axis are in a state that each group comprising one or multiple carbon layer(s) is continued or joined at an end face with another group to have a multiply folded and/or ringed cross section.

4. The crimped carbon fiber as claimed in claim 1, wherein the carbon structure of the outer layer part contains a tree-growth-ring structure.

5. The crimped carbon fiber as claimed in claim 1, wherein a percentage crimp defined by the following formula is 0.5% or more:

$$\text{Percentage crimp(\%)} = (\text{fiber length} - \text{distance between fiber terminals})/(\text{fiber length}) \times 100 \quad (1).$$

6. The crimped carbon fiber as claimed in claim 1, which has a fiber outer diameter of from 2 to 500 nm and a fiber length of 50 μm or less.

7. The crimped carbon fiber as claimed in claim 1, which has an actually measured specific surface area 1.5 times or more the specific surface area in terms of fiber diameter defined by the following formula (2):

$$\text{Specific surface area in terms of fiber diameter}(m^2/g) = 2{,}000/\text{fiber outer diameter(nm)} \quad (2).$$

8. The crimped carbon fiber as claimed in claim 1, which has a lattice spacing (d002) of 002-plane measured by X-ray diffraction of less than 0.34 nm, and a ratio (Id/Ig) between a peak height (Id) in a band of 1340-1349 $cm^{-1}$ and a peak height (Ig) in a band of 1570-1578 $cm^{-1}$ of Raman spectrum of more than 0.35.

9. The crimped carbon fiber as claimed in claim 1, which is a vapor grown carbon fiber.

10. A carbon fiber mixture comprising 5 vol % or more of the crimped carbon fiber claimed in claim 1.

* * * * *